US011594156B2

(12) United States Patent
Song et al.

(10) Patent No.: US 11,594,156 B2
(45) Date of Patent: *Feb. 28, 2023

(54) FOLDABLE BACKPLATE, METHOD FOR MANUFACTURING FOLDABLE BACKPLATE, AND FOLDABLE DISPLAY DEVICE COMPRISING SAME (71) Applicant: LG CHEM, LTD., Seoul (KR)

(72) Inventors: Hee Song, Daejeon (KR); Hyon Gyu Park, Daejeon (KR); Hyun Cheol Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 196 days.

This patent is subject to a terminal disclaimer.

(21) Appl. No.: 17/096,137

(22) Filed: Nov. 12, 2020

(65) Prior Publication Data
US 2021/0065591 A1  Mar. 4, 2021

Related U.S. Application Data (63) Continuation-in-part of application No. PCT/KR2019/015229, filed on Nov. 11, 2019.

(30) Foreign Application Priority Data

Nov. 22, 2018  (KR) .................. 10-2018-0145357

(51) Int. Cl.
G09F 9/30 (2006.01)
C09J 7/20 (2018.01)
(Continued)

(52) U.S. Cl.
CPC .............. *G09F 9/301* (2013.01); *C09J 7/203* (2018.01); *C09J 7/25* (2018.01); *C09J 7/30* (2018.01);
(Continued)

(58) Field of Classification Search
CPC ....... C09J 7/25; C09J 7/385; C09J 7/40; C09J 2203/318; C09J 2301/124; C09J 2433/00; C09J 2479/086; C09J 2301/312; B32B 3/04; B32B 7/02; B32B 7/06; B32B 7/12; B32B 27/281; B32B 2307/546; B32B 2307/732; B32B 2457/20; B32B 27/08; B32B 2307/21; B32B 2307/51;
(Continued)

(56) References Cited

U.S. PATENT DOCUMENTS

| 6,524,675 B1 | 2/2003 | Mikami et al. |
| 10,198,038 B2 | 2/2019 | Jang et al. |
| 10,586,941 B2 | 3/2020 | Lee et al. |
| 2011/0110638 A1 | 5/2011 | Shioda |
| 2013/0236674 A1 | 9/2013 | Kim et al. |
| 2016/0122599 A1 | 5/2016 | Kim et al. |

(Continued)

FOREIGN PATENT DOCUMENTS

| CN | 105567109 A | 5/2016 |
| JP | 2006-299283 A | 11/2006 |
| JP | 2006-312268 A | 11/2006 |

(Continued)

OTHER PUBLICATIONS

International Search Report issued for International Application No. PCT/KR2019/015229 dated Feb. 20, 2020, 5 pages.

*Primary Examiner* — Patricia L. Nordmeyer
(74) *Attorney, Agent, or Firm* — Rothwell, Figg, Ernst & Manbeck, P.C.

(57) ABSTRACT

Provided are a foldable back plate, a method of manufacturing the same and a foldable display device comprising the same.

15 Claims, 2 Drawing Sheets (51) Int. Cl.
  *C09J 7/30*   (2018.01)
  *H04M 1/02*   (2006.01)
  *C09J 7/25*   (2018.01)

(52) U.S. Cl.
  CPC ..... *H04M 1/0268* (2013.01); *C09J 2203/318* (2013.01); *C09J 2301/124* (2020.08); *C09J 2301/312* (2020.08); *Y10T 428/14* (2015.01)

(58) Field of Classification Search
  CPC ...... B32B 2307/708; B32B 2307/7265; B32B 15/08; B32B 2307/20; B32B 2307/308; B32B 2307/736; B32B 2307/748; B32B 7/028; Y10T 428/14
  See application file for complete search history.

(56) References Cited

U.S. PATENT DOCUMENTS

2019/0386247 A1    12/2019  Choi et al.
2021/0147717 A1*    5/2021  Song ..................... B32B 7/12

FOREIGN PATENT DOCUMENTS

| JP | 2007-320058 A  | 12/2007 |
| JP | 5183634 B2     | 4/2013  |
| JP | 2017-177602 A  | 10/2017 |
| KR | 10-2012-0056176 A | 6/2012 |
| KR | 2016-0073668 A | 6/2016  |
| KR | 10-2017-0064453 A | 6/2017 |
| KR | 10-2017-0084402 A | 7/2017 |
| KR | 10-1801690 B1  | 11/2017 |
| WO | 2018-158857 A1 | 9/2018  |

\* cited by examiner

FOLDABLE BACKPLATE, METHOD FOR MANUFACTURING FOLDABLE BACKPLATE, AND FOLDABLE DISPLAY DEVICE COMPRISING SAME

CROSS-REFERENCE TO RELATED APPLICATIONS

The present application is a Continuation-in-part application of International Application No. PCT/KR2019/015229, filed on Nov. 11, 2019, which claims priority to and the benefit of Korean Patent Application No. 10-2018-0145357, filed with the Korean Intellectual Property Office on Nov. 22, 2018, the entire contents of which are incorporated herein by reference.

The present application relates to a foldable back plate, a method of manufacturing the same and a foldable display device comprising the same.

BACKGROUND OF THE INVENTION

Recently, with the development of display-related technology, display devices that can be deformed during use, such as folding, rolling up into a roll, or stretching like a rubber band, are being researched and developed. Since these displays can be deformed in various forms, they can satisfy both the demand for enlargement of the displays at the time of use and the demand for downsizing of the displays for portability.

Deformable display devices may be deformed in a predetermined form, or may be deformed in various forms as desired by a user or in accordance with the requirements of the situation in which the display devices are used. Therefore, it is necessary to recognize the modified forms of displays and to control display devices in response to the recognized forms.

Meanwhile, since deformable display devices have a problem in which the respective components of the display devices are damaged due to the deformation, the respective components of the display devices should satisfy folding reliability and stability.

In particular, in recent years, flexible substrates are mainly used for thinning displays. Display panels using flexible substrates are excessively thin, and thus back plates capable of supporting the display panels are attached to the bottom of the flexible substrates.

Since foldable displays involve folding and unfolding operations, it is essential to attach a support, serving as a guide for operation, to the bottom of the substrates of the foldable displays. In the case of conventional back plates for displays, the cross-section of the substrate is coated with an adhesive and thus an additional process of forming a tackifier or an adhesive agent is needed in order to attach the support, serving as a guide, to the bottom thereof.

Thus, there is the need for research on foldable back plates that are used for foldable displays and enable supports to be attached to back plates through a simple and inexpensive process.

BRIEF SUMMARY OF THE INVENTION

The present application provides a foldable back plate, a method of manufacturing the same and a foldable display device comprising the same.

One embodiment of the present application provides a foldable back plate comprising: a polyimide (PI) substrate; a first adhesive layer provided on one surface of the polyimide substrate; and a second adhesive layer provided on an opposite surface of the surface of the polyimide substrate in contact with the first adhesive layer, wherein a storage modulus (G1) at 20° C. of the polyimide substrate satisfies the following Equation 1, an adhesive force when standing at 23° C. for 2 hours after bonding polyimide (PI) to an opposite surface of the surface of the first adhesive layer in contact with the polyimide substrate is 500 gf/inch or more, and an adhesive force when standing at 23° C. for 2 hours after bonding polyimide (PI) to an opposite surface of a surface of the second adhesive layer in contact with the polyimide substrate is 500 gf/inch or more.

$$1\ \text{GPa} \leq G1 \leq 5\ \text{GPa} \qquad \text{[Equation 1]}$$

Another embodiment of the present application provides a foldable back plate comprising: a polyimide (PI) substrate; a first adhesive layer provided on one surface of the polyimide substrate; a second adhesive layer provided on an opposite surface of the surface of the polyimide substrate in contact with the first adhesive layer; a first release film provided on an opposite surface of the surface of the first adhesive layer in contact with the polyimide substrate; and a second release film provided on an opposite surface of a surface of the second adhesive layer in contact with the polyimide substrate, wherein the peel force at 23° C. of the second release film from the second adhesive layer is 20 gf/inch or less, and the peel force of the first release film from the first adhesive layer is lower than the peel force of the second release film from the second adhesive layer.

Another embodiment of the present application provides a method of manufacturing a foldable back plate comprising: preparing a polyimide (PI) substrate; coating a first adhesive layer on one surface of the polyimide substrate; laminating a first release film on an opposite surface of the surface of the first adhesive layer in contact with the polyimide substrate; preparing a second release film; coating a second adhesive layer on one surface of the second release film; and laminating an opposite surface of the surface of the second adhesive layer in contact with the second release film on an opposite surface of the surface of the polyimide substrate provided with the first adhesive layer, wherein a storage modulus (G1) at 20° C. of the polyimide substrate satisfies the following Equation 1, the peel force at 23° C. of the second release film from the second adhesive layer is 20 gf/inch or less, and a peel force of the first release film from the first adhesive layer is lower than the peel force of the second release film from the second adhesive layer.

$$1\ \text{GPa} \leq G1 \leq 5\ \text{GPa} \qquad \text{[Equation 1]}$$

Yet another embodiment of the present application provides a foldable display device comprising the foldable back plate according to the present application.

Advantageous Effects

The foldable back plate according to one embodiment of the present application comprises a first adhesive layer and a second adhesive layer on both surfaces of a back plate substrate so that the back plate can be adhered to the display panel of the flexible substrate and a support can be attached to an opposite surface thereof without an additional process of forming a tackifier or an adhesive agent.

In addition, the foldable back plate according to the present application comprises the first release film and the second release film on the first adhesive layer and the second adhesive layer, respectively, and the peel force of the first release film from the first adhesive layer is lower than the peel force of the second release film from the second adhesive layer, thus preventing the second release film from being lifted, even when the first release film is removed, during adhesion of the back plate substrate to the display panel of the flexible substrate. The peel force of the second release film from the second adhesive layer is 20 gf/inch or less at 23° C., thereby preventing damage to the display panel even when the second release film is removed in order to attach the support to the back plate substrate.

In addition, the method of manufacturing a foldable back plate according to the present disclosure enables the number of processing steps to be reduced by directly coating the first adhesive layer on the back plate substrate and then laminating the first release film thereon, reduces the amount of film that is used, and increases adhesion to the back plate substrate owing to the direct coating.

REFERENCE NUMERAL

101: First release film
102: First adhesive layer
103: Polyimide substrate
104: Second adhesive layer
105: Second release film
106: Touch film
107: Adhesive layer (PSA)
108: The polarizer
109: Adhesive layer (PSA)
110: Hard coating
111: Colorless Polyimide
112: Hard coating

DETAILED DESCRIPTION OF THE INVENTION

Hereinafter, the present application will be described in more detail.

In the present application, it will be understood that, when a portion is referred to as "including" one element, the portion may further comprise another element, and does not preclude the presence thereof unless clearly indicated otherwise.

Hereinafter, specific embodiments of the present invention will be described in more detail with reference to the attached drawings such that those skilled in the art to which the present invention pertains can easily implement the embodiments. However, the present invention can be implemented in various forms and is not limited to the embodiments described herein.

One embodiment of the present application provides a foldable back plate comprising: a polyimide (PI) substrate; a first adhesive layer provided on one surface of the polyimide substrate; and a second adhesive layer provided on an opposite surface of the surface of the polyimide substrate in contact with the first adhesive layer, wherein a storage modulus (G1) at 20° C. of the polyimide substrate satisfies the following Equation 1, an adhesive force when standing at 23° C. for 2 hours after bonding polyimide (PI) to an opposite surface of the surface of the first adhesive layer in contact with the polyimide substrate is 500 gf/inch or more, and an adhesive force when standing at 23° C. for 2 hours after bonding polyimide (PI) to an opposite surface of a surface of the second adhesive layer in contact with the polyimide substrate is 500 gf/inch or more.

$$1 \text{ GPa} \leq G1 \leq 5 \text{ GPa} \qquad \text{[Equation 1]}$$

The foldable back plate according to one embodiment of the present application comprises the first adhesive layer and the second adhesive layer on both surfaces of the back plate substrate so that the back plate can be adhered onto the display panel of the flexible substrate and a support can be attached to an opposite surface thereof, without an additional process of forming a tackifier or an adhesive agent.

In one embodiment of the present application, the adhesive force when standing at 23° C. for 2 hours after bonding polyimide (PI) to an opposite surface of the surface of the first adhesive layer in contact with the polyimide substrate may be 500 gf/inch or more.

In another embodiment, the adhesive force when standing at 23° C. for 2 hours after bonding polyimide (PI) to an opposite surface of the surface of the first adhesive layer in contact with the polyimide substrate may be 500 gf/inch or more, preferably 550 gf/inch or more and more preferably 700 gf/inch or more.

In another embodiment, the adhesive force of the first adhesive layer when standing at 23° C. for 2 hours after bonding polyimide (PI) to an opposite surface of the surface of the first adhesive layer in contact with the polyimide substrate may be 2,500 gf/inch or less, preferably 2,300 gf/inch or less and more preferably 2,000 gf/inch or less.

In one embodiment, the adhesive force when standing at 23° C. for 2 hours after bonding polyimide (PI) to an opposite surface of the surface of the second adhesive layer in contact with the polyimide substrate may be 500 gf/inch or more.

In another embodiment, the adhesive force when standing at 23° C. for 2 hours after bonding polyimide (PI) to an opposite surface of the surface of the second adhesive layer in contact with the polyimide substrate may be 500 gf/inch or more, preferably 550 gf/inch or more and more preferably 700 gf/inch or more.

In another embodiment, the adhesive force when standing at 23° C. for 2 hours after bonding polyimide (PI) to an opposite surface of the surface of the second adhesive layer in contact with the polyimide substrate may be 2,500 gf/inch or less, preferably 2,300 gf/inch or less and more preferably 2,000 gf/inch or less.

The adhesive force of each of the first and second adhesive layers when standing at 23° C. for 2 hours after bonding polyimide (PI) to an opposite surface of the surface of each of the first and second adhesive layers in contact with the polyimide substrate was measured at an angle of 180° and a peeling speed of 2,400 mm/min using a texture analyzer (Stable Micro Systems Co., Ltd.) and the adhesive force with regard to the foldable back plate prepared according to the present disclosure was measured at 23° C.

In one embodiment of the present application, G1 satisfies $1 \text{ GPa} \leq G1 \leq 5 \text{ GPa}$, preferably $1.5 \text{ GPa} \leq G1 \leq 4 \text{ GPa}$, and more preferably $2 \text{ GPa} \leq G1 \leq 4 \text{ GPa}$.

The polyimide substrate according to the present application satisfies the range of G1, thus maintaining reliability even after repeated folding multiple times, minimizing stress values generated during folding and realizing sufficient hardness to support the display panel when subsequently applied to the back plate of the foldable display.

Another embodiment of the present application provides a foldable back plate comprising: a polyimide (PI) substrate; a first adhesive layer provided on one surface of the polyimide substrate; a second adhesive layer provided on an opposite surface of the surface of the polyimide substrate in contact with the first adhesive layer; a first release film provided on an opposite surface of the surface of the first adhesive layer in contact with the polyimide substrate; and a second release film provided on an opposite surface of the surface of the second adhesive layer in contact with the polyimide substrate, wherein the peel force at 23° C. of the second release film from the second adhesive layer is 20 gf/inch or less, and the peel force of the first release film from the first adhesive layer is lower than the peel force of the second release film from the second adhesive layer.

In addition, the foldable back plate according to the present application comprises the first release film and the second release film on the first adhesive layer and the second adhesive layer, respectively, and the peel force of the first release film from the first adhesive layer is lower than the peel force of the second release film from the second adhesive layer, thus preventing the second release film from being lifted, even when the first release film is removed, during adhesion of the back plate substrate to the display panel of the flexible substrate. The peel force of the second release film from the second adhesive layer is 20 gf/inch or less at 23° C., thereby preventing damage to the display panel even when the second release film is removed in order to attach the support to the back plate substrate.

Figure 1:
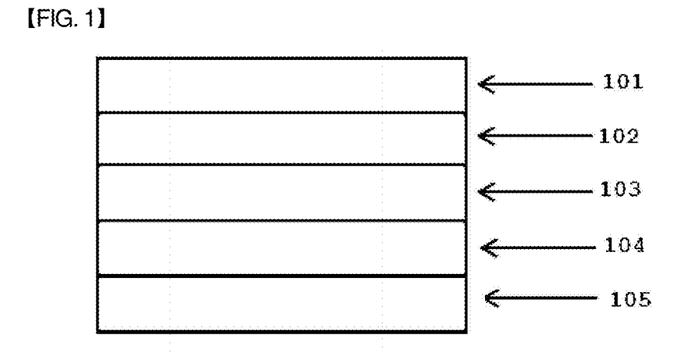
FIG. 1 is a sectional view showing the laminated structure of a foldable back plate according to one embodiment of the present application.

FIG. 1 shows a laminated structure of a foldable back plate according to the present application, and specifically shows that a first adhesive layer 102 and a second adhesive layer 104 are provided on both surfaces of a polyimide (PI) substrate 103, a first release film 101 is provided on one surface of the first adhesive layer 102 and a second release film 105 is provided on one surface of the second adhesive layer 104. In addition, when the foldable back plate is applied to the foldable display device later, the first release film 101 and the second release film 105 may be removed.

One embodiment of the present application provides a foldable back plate wherein an elongation at break at 20° C. of the polyimide substrate is 20% or more and 200% or less.

In another embodiment, the elongation at break of the polyimide substrate at 20° C. is 20% or more and 200% or less, preferably 40% or more and 180% or less, more preferably 70% or more and 150% or less.

The elongation at break of the polyimide substrate means (L2−L1)/L1*100(%) wherein L1 represents the initial length of the polyimide substrate and L2 represents the length of a fracture occurring when stretched.

The storage modulus (G1) and the elongation at break were measured in accordance with the method of KS M ISO527 using a UTM produced by Zwick Corporation. The film to be measured is cut to pieces 5 mm in width and 60 mm or longer in length, the distance between the grips is set to 40 mm, and the storage modulus (G1) and the elongation at break can be determined by values measured while pulling the sample film at a rate of 20 mm/min.

One embodiment of the present application provides a foldable back plate wherein the polyimide substrate has a heat shrinkage at 200° C. of 0.1% or less.

In another embodiment, the heat shrinkage at 200° C. of the polyimide substrate may be 0.1% or less, preferably 0.09% or less, and more preferably 0.08% or less.

In another embodiment, the heat shrinkage at 200° C. of the polyimide substrate may be 0.03% or more.

"Heat shrinkage" refers to the degree of shrinkage in the direction having a maximum shrinkage force when heat is applied to the polyimide substrate, and means (M1−M2)/M1*100, wherein M1 represents the initial length of the polyimide substrate and M2 represents the shrinkage length in the shrinkage direction after heating at 200° C. for 2 hours.

As the polyimide substrate has the heat shrinkage force in the above range, even when heat is applied in the back-plate coating process, the shrinkage force is low and thus deformation does not occur.

The foldable back plate according to the present application uses the polyimide substrate satisfying the above conditions, thereby avoiding plastic deformation of the back plate and providing excellent durability even when the folding and unfolding operations of the foldable display is repeated, and restoring the strain generated during folding without permanent deformation during unfolding.

One embodiment of the present application provides a foldable back plate wherein the storage modulus at −30° C. of the first adhesive layer and the second adhesive layer is G2, the storage modulus at 60° C. of the first adhesive layer and the second adhesive layer is G3, and G2 and G3 satisfy the following Equations 2 and 3 below.

$$1\times10^4\ Pa \leq G2 \leq 1\times10^6\ Pa \qquad \text{[Equation 2]}$$

$$1\times10^4\ Pa \leq G3 \leq 1\times10^6\ Pa \qquad \text{[Equation 3]}$$

In one embodiment of the present application, G2 satisfies $1\times10^4\ Pa \leq G2 \leq 1\times10^6\ Pa$, preferably $1\times10^5\ Pa \leq G2 \leq 1\times10^6\ Pa$, and more preferably $1\times10^5\ Pa \leq G2 \leq 9\times10^5\ Pa$.

In one embodiment of the present application, G3 satisfies $1\times10^4\ Pa \leq G3 \leq 1\times10^6\ Pa$, preferably $1\times10^4\ Pa \leq G3 \leq 1\times10^5\ Pa$, and more preferably $1\times10^4\ Pa \leq G3 \leq 8\times10^4\ Pa$.

G2 and G3 satisfy the predetermined ranges, thereby minimizing stress during folding and preventing generation of foreign matter or bleeding out during the cutting process or storage process.

One embodiment of the present application provides a foldable back plate wherein an initial adhesive force (gf/inch) of each surface of the first adhesive layer and the second adhesive layer in contact with the polyimide substrate after standing at 23° C. for 2 hours is A1, the late adhesive force (gf/inch) of each surface after standing at 60° C./humidity 90% for 20 days is A2, and A1 and A2 satisfy the following Equation 4:

$$A1\times0.8 \leq A2 \qquad \text{[Equation 4]}$$

In one embodiment of the present application, A1 is 500 gf/inch or more and 2,000 gf/inch or less, preferably 600 gf/inch or more and 1,800 gf/inch or less, and more preferably 800 gf/inch or more and 1,500 gf/inch or less.

In one embodiment of the present application, A2 is 400 gf/inch or more and 2,500 gf/inch or less, preferably 500 gf/inch or more and 2,000 gf/inch or less, and more preferably 650 gf/inch or more and 1,800 gf/inch or less.

A1 and A2 of the first adhesive layer and the second adhesive layer satisfy the predetermined ranges, thereby maintaining the adhesive force to the back plate substrate even under high-temperature high-humidity conditions, thus avoiding lifting and bubbling.

In one embodiment of the present application, the first adhesive layer and the second adhesive layer may comprise at least one selected from the group consisting of an acrylic adhesive layer, a rubber adhesive layer and a silicone adhesive layer.

In another embodiment, the first adhesive layer and the second adhesive layer may comprise an acrylic adhesive layer.

One embodiment of the present application provides a foldable back plate wherein the peel force at 23° C. of the first release film from the first adhesive layer is 15 gf/inch or less.

In another embodiment, the peel force at 23° C. of the first release film from the first adhesive layer may be 12 gf/inch or less, preferably 11 gf/inch or less, and more preferably 10 gf/inch or less.

In another embodiment, the peel force at 23° C. of the first release film from the first adhesive layer may be 3 gf/inch or more, preferably 4 gf/inch or more, and more preferably 5 gf/inch or more.

In another embodiment, the peel force at 23° C. of the first release film from the first adhesive layer may be 6 gf/inch or more and 15 gf/inch or less.

One embodiment of the present application provides a foldable back plate wherein the peel force at 23° C. of the second release film from the second adhesive layer is 20 gf/inch or less.

In another embodiment, the peel force at 23° C. of the second release film from the second adhesive layer may be 20 gf/inch or less, preferably 19 gf/inch or less, and more preferably 18 gf/inch or less.

In another embodiment, the peel force at 23° C. of the second release film from the second adhesive layer may be 10 gf/inch or more, preferably 11 gf/inch or more, and more preferably 12 gf/inch or more.

In another embodiment, the peel force at 23° C. of the second release film from the second adhesive layer may be 13 gf/inch or more and 18 gf/inch or less.

The peel force of the first release film from the first adhesive layer and the peel force of the second release film from the second adhesive layer were measured at an angle of 180° and a peeling speed of 2,400 mm/min using a texture analyzer (Stable Micro Systems Co., Ltd.) and the peel force of the foldable back plate prepared according to the present disclosure was measured at 23° C.

The foldable back plate according to the present application comprises the first release film and the second release film on the first adhesive layer and the second adhesive layer, respectively, and the peel force of the first release film from the first adhesive layer is controlled to be lower than the peel force of the second release film from the second adhesive layer, thus preventing the second release film from being lifted, even when the first release film is removed, during adhesion of the back plate substrate to the display panel of the flexible substrate, and the peel force of the second release film from the second adhesive layer has the predetermined range, thereby preventing the display panel from being damaged even when the second release film is removed to attach the support to the back plate substrate.

That is, the foldable back plate according to the present application has adhesive layers on both surfaces of the back plate substrate, thereby requiring no additional process when bonding to the display panel and the support, and the peel force of the release film from each adhesive layer is medium or weak, thereby preventing damage to the display panel and the back plate substrate when the back plate is bonded thereto.

The first and second release films refer to transparent layers attached to one surface of the first and second adhesive layers in order to protect the first and second adhesive layers, which are very thin, and may be films having excellent mechanical strength, thermal stability, moisture-blocking property, isotropy and like. For example, the first and second release films may be acetate (such as triacetyl cellulose, TAC), polyester, polyether sulfone, polycarbonate, polyamide, polyimide, polyolefin, cycloolefin, polyurethane, silicone or acrylic resin films or the like. Any commercially available silicone release film may be used without limitation.

One embodiment of the present application provides a foldable back plate wherein the first release film and the second release film are silicone-based films.

In one embodiment of the present application, the first release film and the second release film may be further subjected to an anti-static treatment to prevent damage to the display panel by static electricity when attached to the bottom of the display panel.

One embodiment of the present application provides a foldable back plate wherein the surface resistance of the first release film and the second release film is $10^{10}$ Ω/sq or less at 500V or less.

One embodiment of the present application provides a foldable back plate wherein the surface resistance at 500V or less of the first release film and the second release film is $10^{10}$ Ω/sq or less, preferably, $3\times10^{9}$ Ω/sq or less and more preferably $1\times10^{9}$ Ω/sq or less.

In another embodiment of the present application, the surface resistance of the first release film and the second release film is $10^{7}$ Ω/sq or more at 500V or less.

The surface resistance of the first release film and the second release film can be measured using a concentric electrode on the back surface of the test specimen PET, and can be measured at an applied voltage of 500V, and at 25° C. and 55 RH % for an applied time of 10 seconds using MCT-HT800 (Mitsubishi Co., Ltd.).

The first release film and the second release film have surface resistance values within the range defined above due to antistatic treatment, thereby preventing subsequent damage to the display panel due to static electricity when the first release film is peeled off and the first release film and the second release film are then attached to the bottom of the display panel.

One embodiment of the present application provides a foldable back plate, wherein the polyimide substrate has a thickness of 10 μm or more and 150 μm or less.

In another embodiment, the polyimide substrate may have a thickness of 20 μm or more and 120 μm or less, preferably 30 μm or more and 100 μm or less, and more preferably 40 μm or more and 80 μm or less.

Since the polyimide substrate has a thickness within the predetermined range, the polyimide substrate can efficiently serve as a support when the polyimide substrate is used as a back plate of a foldable display, does not cause handling problems during roll coating, and has a suitable radius-of-curvature deviation and thus minimizes stress when folding.

One embodiment of the present application provides a foldable back plate wherein each of the first adhesive layer and the second adhesive layer has a thickness of 10 μm or more and 100 μm or less.

In another embodiment, each of the first adhesive layer and the second adhesive layer has a thickness of 10 μm or more and 100 μm or less, preferably 15 μm or more and 80 μm or less, and more preferably 15 μm or more and 50 μm or less.

When the first adhesive layer and the second adhesive layer are within the predetermined thickness ranges, stress is minimized during folding, thereby minimizing deformation as compared to thickness. When the first adhesive layer and the second adhesive layer are within the predetermined thickness ranges, radius-of-curvature deviation is suitable, thus minimizing stress applied to the outermost film when folding.

One embodiment of the present application provides a foldable back plate, wherein the thickness of each of the first release film and the second release film is 10 μm or more and 150 μm or less.

In another embodiment, each of the first release film and the second release film has a thickness of 10 μm or more and 150 μm or less, preferably 15 μm or more and 125 μm or less, and more preferably 25 μm or more and 80 μm or less.

Since the thickness of each of the first release film and the second release film is within the predetermined range, there is an advantage in that handling during roll coating is excellent.

Another embodiment of the present application provides a method of manufacturing a foldable back plate comprising: preparing a polyimide (PI) substrate; coating a first adhesive layer on one surface of the polyimide substrate; laminating a first release film on an opposite surface of the surface of the first adhesive layer in contact with the polyimide substrate; preparing a second release film; coating a second adhesive layer on one surface of the second release film; and laminating an opposite surface of the surface of the second adhesive layer in contact with the second release film on an opposite surface of the surface of the polyimide substrate provided with the first adhesive layer, wherein a storage modulus (G1) at 20° C. of the polyimide substrate satisfies the following Equation 1, the peel force at 23° C. of the second release film from the second adhesive layer is 20 gf/inch or less, and the peel force of the first release film from the first adhesive layer is lower than the peel force of the second release film from the second adhesive layer.

$$1 \text{ GPa} \leq G1 \leq 5 \text{ GPa} \quad \text{[Equation 1]}$$

The description of each layer included in the foldable back plate is the same as mentioned above.

The manufacturing method of the foldable back plate according to the present disclosure enables the number of processing steps to be reduced by directly coating the first adhesive layer on the back plate substrate and then laminating the first release film thereon, reduces the amount of film that is used, and increases adhesion with the back plate substrate owing to the direct coating.

One embodiment of the present application provides a method of manufacturing a foldable back plate wherein the coating a first adhesive layer and the coating a second adhesive layer are carried out by direct coating.

The method of manufacturing a foldable back plate according to the present disclosure is carried out by direct coating, thereby making it to easily change the release force of the first release film and the second release film. The foldable back plate thus manufactured is characterized in that the peel force of the first release film from the first adhesive layer may be lower than the peel force of the second release film from the second adhesive layer.

In the foldable back plate according to the present application, after removing the first release film and the second release film, one surface thereof may be attached to the display panel of the foldable display, and the other surface thereof may be attached to a support of the back plate.

The support may serve as a guide for folding the foldable display, any foldable support may be used without limitation, and commercially available materials such as plastics, metals and highly rigid films may be used as necessary without limitation.

Hereinafter, specific examples of the present invention will be described in more detail such that those skilled in the art to which the present invention pertains can easily implement the examples. However, the present invention can be implemented in various forms and is not limited to the examples described herein.

PRODUCTION EXAMPLE

<Production of Foldable Back Plate>

1. Preparation of First Copolymer

A monomer mixture of ethylhexyl acrylate (EHA) and acrylic acid (AA) was added to a 1 L reactor, in which nitrogen gas was refluxed and in which a cooler was installed to facilitate temperature control, and then ethyl acetate (EAc) was added as a solvent thereto. Then, nitrogen gas was purged for about 1 hour to remove oxygen and then the reactor temperature was maintained at 62° C. The mixture was homogeneously mixed, 400 ppm of azobisisobutyronitrile (AIBN) as a reaction initiator and 400 ppm of n-dodecylmercaptan (n-DDM) as a chain transfer agent were added thereto, and the resulting mixture was allowed to react. After the reaction, EAc was diluted to prepare a copolymer having a weight average molecular weight of 2 million.

2. Preparation of Second Copolymer

A monomer mixture of butyl acrylate (BA) and acrylic acid (AA) was added to a 1 L reactor, in which nitrogen gas was refluxed and in which a cooler was installed to facilitate temperature control, and then ethyl acetate (EAc) was added as a solvent thereto. Then, nitrogen gas was purged for about 1 hour to remove oxygen and then the reactor temperature was maintained at 62° C. The mixture was homogeneously mixed, 400 ppm of azobisisobutyronitrile (AIBN) as a reaction initiator and 400 ppm of n-dodecylmercaptan (n-DDM) as a chain transfer agent were added thereto, and the resulting mixture was allowed to react. After the reaction, EAc was diluted to prepare a copolymer having a weight average molecular weight of 2 million.

3. Production of Adhesive Layer-1

An epoxy-based crosslinking agent was added to 100 g of the first copolymer prepared as described above, and was diluted to 18% by weight in an ethyl acetate solution and then mixed homogenously. The adhesive composition polymerized in accordance with the designed composition was diluted in a solvent for adjusting a solid content to provide a viscosity suitable for coating (500 to 1,500 cp) and was then mixed for 15 minutes or more using a mechanical stirrer. The mixture was allowed to stand at room temperature to remove the bubbles generated during mixing, and a coating film was formed using an applicator and then dried at 140° C. for 3 minutes using a Mathis oven to prepare an adhesive layer-1.

4. Production of Adhesive Layer-2

An epoxy-based crosslinking agent was added to 100 g of the second copolymer prepared as described above, and was diluted to 18% by weight in an ethyl acetate solution and then mixed homogenously. The adhesive composition polymerized in accordance with the designed composition was diluted in a solvent for adjusting a solid content to provide a viscosity suitable for coating (500 to 1,500 cp) and was then mixed for 15 minutes or more using a mechanical stirrer. The mixture was allowed to stand at room temperature to remove the bubbles generated during mixing, and a coating film was formed using an applicator and then dried at 140° C. for 3 minutes using a Mathis oven to prepare an adhesive layer-2.

5. Production of Foldable Back Plate

1) Examples 1 to 3 and Comparative Example 1

The adhesive layer-1 prepared above was coated on one surface of a back plate substrate having the physical properties shown in Table 1 below, and a light-peeling release film of Table 1 was laminated on an opposite surface of a surface of the adhesive layer-1 in contact with the back plate substrate.

Then, the heavy-peeling release film shown in Table 1 was prepared, the adhesive layer-1 prepared above was coated on the heavy-peeling release film, and the opposite surface of the surface of the adhesive layer-1 in contact with the heavy-peeling release film and the opposite surface of the surface on which the adhesive layer-1 of the back plate substrate prepared above was formed were laminated to produce a foldable back plate having a triple-layer structure (adhesive layer/back plate/adhesive layer).

2) Production of Comparative Example 2

A foldable back plate having a triple-layer (adhesive layer/back plate/adhesive layer) structure was produced in the same manner as in Examples 1 to 3 and Comparative Example 1, except that the adhesive layer-2 was used, instead of the adhesive layer-1, regarding the method of manufacturing the foldable back plate in Examples 1 to 3 and Comparative Example 1.

TABLE 1

| | | | Ex. 1 | Ex. 2 | Ex. 3 | Comp. Ex. 1 | Comp. Ex. 2 |
|---|---|---|---|---|---|---|---|
| | | | \multicolumn{5}{c}{Configuration of foldable back plate} | | | | |
| | | | 3 layer 25/50/25 μm | 3 layer 25/50/25 μm | 3 layer 25/50/25 μm | 3 layer 25/50/25 μm | 3 layer 25/50/25 μm |
| Adhesive agent | Storage modulus (G', Pa) @−30° C. | | $5.4 \times 10^5$ | $5.4 \times 10^5$ | $5.4 \times 10^5$ | $5.4 \times 10^5$ | $5.8 \times 10^5$ |
| | Storage modulus (G', Pa)@60° C. | | $3 \times 10^4$ | $3 \times 10^4$ | $3 \times 10^4$ | $3 \times 10^4$ | $5.1 \times 10^4$ |
| | Tensile Stress Relaxation (DMA) Temperature: −20° C. Strain: 12% Time: deformation for 10 min | Initial Stress Final Stress Stress drop (%) | 12941 6682 48.4 | 12941 6682 48.4 | 12941 6682 48.4 | 12941 6682 48.4 | 17810 13066 26.6 |
| | PI * adhesive force (gf/in, 2.4 mpm) | Initial 80° C. 20 days 60° C. 20 days | 1167 1316 1326 | 1167 1316 1326 | 1167 1316 1326 | 1167 1316 1326 | 363.5 617.6 609.2 |
| Back plate substrate | Storage modulus (E', GPa) @20° C. | | 2.6 | 3.2 | 3.5 | 6.2 | 2.6 |
| | Elongation at break (%) @20° C. | | 116 | 110 | 74 | 71 | 116 |
| | Heat shrinkage (%) 200°, 2 hr IPC-TM-650 2.2.4 Method A | | 0.04 | 0.08 | 0.04 | 0.02 | 0.04 |
| Release film** | Light-peeling release peel force (gf/in, 2.4 mpm) | | 7 | 7 | 7 | 7 | 5 |
| | Medium-peeling release peel force (gf/in, 2.4 mpm) | | 14 | 14 | 14 | 14 | 9 |
| Static folding (60° C. 90% RH, 2.5 R, 20 days) | | | OK | OK | OK | OK | N.G |
| Dynamic folding (25° C., 2.5 R, 100,000 times) | | | OK | OK | OK | N.G | N.G |
| Waviness after folding test | | | OK | OK | OK | N.G | OK |

| | | | Thickness | Modulus | Optical | | |
|---|---|---|---|---|---|---|---|
| | Manufacturer | Name of product | μm | Gpa | Transmittance | Haze | b* |
| PI | Pi Advanced Materials | GF200 | 50 | 3.5 | 62 | 14.6 | 89.5 |

| | | | Thickness | | Surface resistance | Optical | |
|---|---|---|---|---|---|---|---|
| | Manufacturer | Name of product | μm | Coating | Ω/sq | Transmittance | Haze |
| Light-peeling release film | SK HTM | RF01ASW | 50 | Silicone based | $10^7 \sim 10^9$ | 92.5 | 4.3 |
| Medium-peeling release film | SK HTM | RF02ASD | 75 | Silicone based | $10^7 \sim 10^9$ | 91.5 | 6.4 |

*Information on PI used
**Information on Light-peeling release film and Medium-peeling release film.

The Evaluation of Static Folding Test and Dynamic Folding Test

Figure 2:
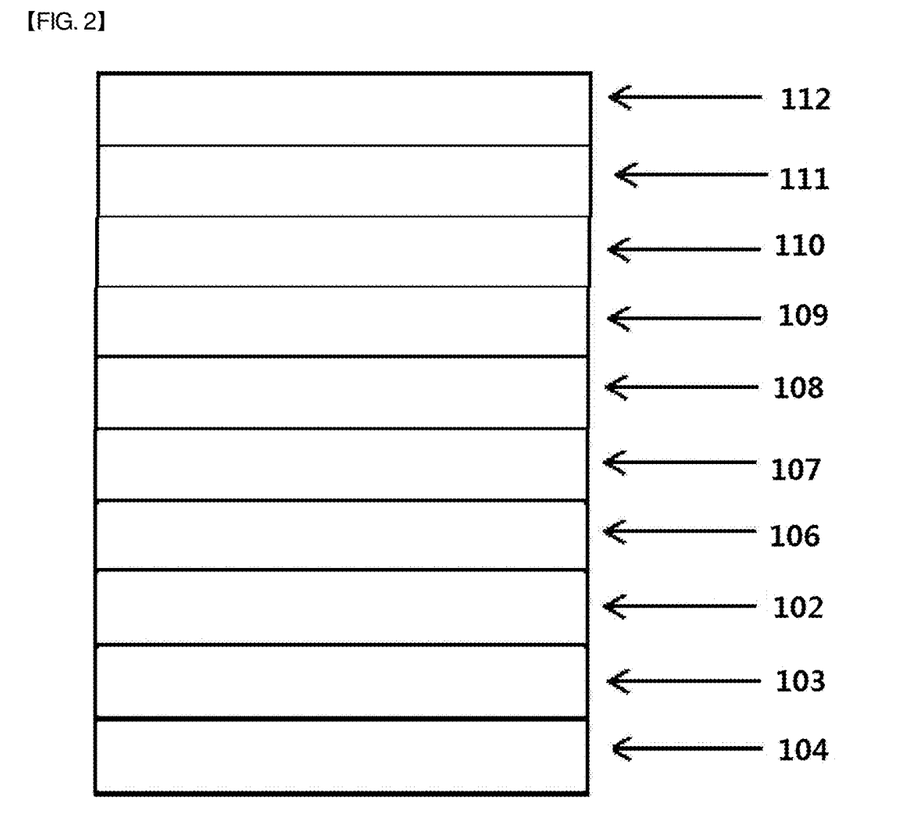
FIG. 2 is a sectional view showing the laminated structure of a sample for the evaluation of folding test.

Samples of the laminated structure were prepared for the folding test under the conditions of Table 1 of the present application. FIG. 2 is a sectional view showing the laminated structure of a sample for the evaluation of folding test.

More specifically, a cover window (Manufacturer: LGC) was prepared with a layer of hard coating on both sides of a thickness of 40 μm CPI (Colorless Polyimide). The polarizer (Manufacturer: LGC) and the touch film (ITO Film, Manufacturer: LGC) were laminated sequentially through the adhesive layer (PSA) on one surface of a cover window. Then, a foldable back plate of Table 1 was laminated on one surface of the touch film.

The laminated structure was cut into a specimen having a size of 140 mm×80 mm, and was then made the laminated structure of a sample.

Static Folding Test

Figure 3:
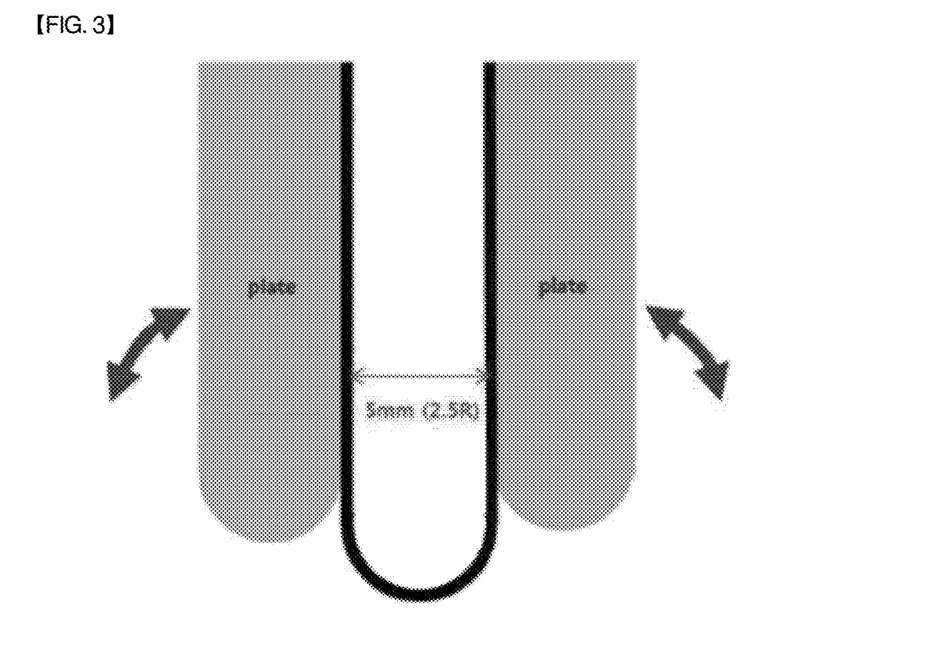
FIG. 3 is a diagram of the folding test.

A specimen was produced in a FIG. 2 structure, were folded in half, inserted into parallel plates having a 5 mm spacing therebetween like the FIG. 3 and allowed to stand at 60° C. and 90% RH. After 20 days, the specimen was collected, and the degree of bubbling, the degree of lifting and the waveness were visually observed.

In Table 1, cases where neither bubbling nor lifting occurred after the test were recorded as OK, and cases where bubbling and lifting were observed after the test were recorded as N.G.

Dynamic Folding Test

A specimen was produced in a FIG. 2 structure, and inserted into parallel plates having a 5 mm spacing therebetween like the FIG. 3, and a test of folding 100,000 times (once a second) was performed at 25° C. After the test, the specimen was collected, and the degree of bubbling and the degree of lifting were visually observed.

In Table 1, cases where neither bubbling nor lifting occurred were recorded as OK and cases where bubbling and lifting were observed were recorded as N.G.

The Evaluation of Storage Modulus@-30□ (G2) and Storage Modulus@ 60□ (G3)

The storage modulus (G2 and G3) was measured at the temperature (at −30° C. and 60° C.) using an Advanced Rheometric Expansion System G2 (TA). The adhesive layer was repeatedly stacked and cut into a specimen having a thickness of 1 mm, and was then measured using a parallel plate fixture having a diameter of 8 mm. Measurement conditions: 1 Hz, 5% strain, initial temperature −40° C., final temperature 90° C., 10° C./min.

In Table 1, OK indicates that no lifting occurs between the back plate substrate and the first and second adhesive layers during the folding test under the conditions of Table 1, and N.G indicates that lifting occurs between the back plate substrate and the first and second adhesive layers during the folding test under the conditions of Table 1. As can be seen from Table 1, since, in Examples 1 to 3 of the present application, the first adhesive layer and the second adhesive layer satisfy a specific adhesive force range and the back plate substrate satisfies the range defined in Equation 1, reliability can be maintained even after repeated folding multiple times, the stress generated during folding can be minimized, and the hardness enough to support the display panel can be satisfied.

In Table 1, Comparative Example 1 is a case in which the same type of adhesive agent as in Examples 1 to 3 of the present application is used, but the range of Equation 1 (storage modulus) of the back plate substrate is not satisfied, and Comparative Example 2 is a case in which the same type of back plate substrate as in Examples 1 to 3 of the present application is used, but the kind of adhesive agent differs and thus the range of amount of adhesive agent used is not satisfied. As can be seen from Comparative Example 1 and Comparative Example 2, Comparative Example 1 and Comparative Example 2 exhibit poor folding test results than Examples 1 to 3 of the present invention.

In addition, it can be seen that the foldable back plate according to the present application comprises the first adhesive layer and the second adhesive layer on both surfaces of the back plate substrate so that the back plate can be adhered to the display panel of the flexible substrate and a support can be attached to an opposite surface thereof without an additional process of forming a tackifier or an adhesive agent.

The invention claimed is:

1. A foldable back plate comprising:
a polyimide (PI) substrate;
a first adhesive layer provided on a surface of the polyimide substrate; and
a second adhesive layer provided on a surface opposite to the surface of the polyimide substrate in contact with the first adhesive layer,
wherein a storage modulus (G1) at 20° C. of the polyimide substrate satisfies Equation 1, $$1 \text{ GPa} \leq G1 \leq 5 \text{ GPa} \qquad [\text{Equation 1}]$$

wherein, an initial adhesive force of the first adhesive layer is at least 500 gf/inch, and
an initial adhesive force of the second adhesive layer is at least 500 gf/inch, and
wherein the initial adhesive force is measured at 23° C. after attaching a polyimide (PI) to the first adhesive layer or to the second adhesive layer on a surface opposite of the surface of the first adhesive layer or the second adhesive layer that is in contact with the polyimide substrate and then the polyimide-attached first adhesive layer or the polyimide-attached second adhesive layer standing at 23° C. for 2 hours.

2. The foldable back plate of claim 1, wherein a storage modulus at −30° C. of each of the first adhesive layer and the second adhesive layer and,
a storage modulus at 60° C. of each of the first adhesive layer and the second adhesive layer satisfy Equations 2 and 3 below:

$$1 \times 10^4 \text{ Pa} \leq G2 \leq 1 \times 10^6 \text{ Pa} \qquad [\text{Equation 2}]$$

$$1 \times 10^4 \text{ Pa} \leq G3 \leq 1 \times 10^6 \text{ Pa} \qquad [\text{Equation 3}]$$

wherein G2 is a storage modulus at −30° C. of each of the first adhesive layer and the second adhesive layer and
G3 is a storage modulus at 60° C. of each of the first adhesive layer and the second adhesive layer.

3. The foldable back plate of claim 1, wherein the initial adhesive force (gf/inch) of each of the first adhesive layer and the second adhesive layer and
a late adhesive force (gf/inch) of each of the first adhesive layer and the second adhesive layer satisfy Equation 4:

$$A1 \times 0.8 \leq A2 \qquad [\text{Equation 4}]$$

wherein A1 is the initial adhesive force (gf/inch) of each of the first adhesive layer and the second adhesive layer and
A2 is the late adhesive force (gf/inch) of each of the first adhesive layer and the second adhesive layer, and
wherein the late adhesive force is measured after the polyimide-attached first adhesive layer or the polyimide-attached second adhesive layer standing at 60° C./humidity 90% for 20 days.

4. The foldable back plate of claim 1, wherein the polyimide substrate has an elongation at break at 20° C. of 20% or more and 200% or less.

5. The foldable back plate of claim 1, wherein the polyimide substrate has a heat shrinkage at 200° C. of 0.1% or less.

6. The foldable back plate of claim 1, wherein the polyimide substrate has a thickness of 10 μm or more and 150 μm or less.

7. The foldable back plate of claim 1, wherein each of the first adhesive layer and the second adhesive layer has a thickness of 10 μm or more and 100 μm or less.

8. The foldable back plate of claim 1, further comprising:
a first release film provided on an opposite surface of the first adhesive layer in contact with the polyimide substrate; and
a second release film provided on an opposite surface of the second adhesive layer in contact with the polyimide substrate,
wherein a peel force at 23° C. of the second release film from the second adhesive layer is 20 gf/inch or less, and
a peel force at 23° C. of the first release film from the first adhesive layer is lower than the peel force of the second release film from the second adhesive layer.

9. The foldable back plate of claim 8, wherein the peel force at 23° C. of the first release film from the first adhesive layer is 15 gf/inch or less.

10. The foldable back plate of claim 8, wherein each of the first release film and the second release film has a thickness of 10 μm or more and 150 μm or less.

11. The foldable back plate of claim 8, wherein the first release film and the second release film are silicone-based films.

12. The foldable back plate of claim 8, wherein each of the first release film and the second release film has a surface resistance of $10^{10}$ Ω/sq or less at 500V or less.

13. A foldable display device comprising the foldable back plate according to claim 1.

14. A method of manufacturing a foldable back plate comprising:
providing a polyimide (PI) substrate;
coating a first adhesive layer on a surface of the polyimide substrate;
laminating a first release film on a surface opposite to the surface of the first adhesive layer in contact with the polyimide substrate;
providing a second release film;
coating a second adhesive layer on a surface of the second release film; and
laminating a surface opposite to the surface of the second adhesive layer in contact with the second release film on a surface opposite to the surface of the polyimide substrate in contact with the first adhesive layer,
wherein a storage modulus (G1) at 20° C. of the polyimide substrate satisfies Equation 1:

$$1\ \text{GPa} \leq G1 \leq 5\ \text{GPa} \qquad [\text{Equation 1}]$$

a peel force at 23° C. of the second release film from the second adhesive layer is 20 gf/inch or less, and
a peel force at 23° C. of the first release film from the first adhesive layer is lower than the peel force of the second release film from the second adhesive layer.

15. The method of claim 14, wherein the coating the first adhesive layer and the coating the second adhesive layer are carried out by direct coating.

* * * * *